(12) United States Patent
Ohya

(10) Patent No.: US 10,095,936 B2
(45) Date of Patent: Oct. 9, 2018

(54) EYE OPEN STATE DETERMINATION DEVICE AND EYE OPEN STATE DETERMINATION METHOD

(71) Applicant: DENSO CORPORATION, Kariya, Aichi-pref. (JP)

(72) Inventor: Naoshi Ohya, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 237 days.

(21) Appl. No.: 14/780,668

(22) PCT Filed: Apr. 9, 2014

(86) PCT No.: PCT/JP2014/002023
§ 371 (c)(1),
(2) Date: Sep. 28, 2015

(87) PCT Pub. No.: WO2014/167848
PCT Pub. Date: Oct. 16, 2014

(65) Prior Publication Data
US 2016/0048735 A1    Feb. 18, 2016

(30) Foreign Application Priority Data

Apr. 12, 2013  (JP) ................ 2013-084350

(51) Int. Cl.
*H04N 7/18* (2006.01)
*G06K 9/00* (2006.01)
(Continued)

(52) U.S. Cl.
CPC ....... *G06K 9/00845* (2013.01); *G06K 9/0061* (2013.01); *G06K 9/00617* (2013.01);
(Continued)

(58) Field of Classification Search
CPC ................................... G06K 9/00845
(Continued)

(56) References Cited

U.S. PATENT DOCUMENTS 5,627,621 A * 5/1997 Kodama ................ G03B 13/02
                                                351/208
5,990,973 A * 11/1999 Sakamoto ............ G06K 9/0061
                                                348/246
(Continued)

FOREIGN PATENT DOCUMENTS

JP    H07-159675 A    6/1995
JP    2000-102510 A    4/2000
(Continued)

OTHER PUBLICATIONS

International Search Report and Written Opinion dated Jul. 15, 2014 for the International Application No. PCT/JP2014/002023.

*Primary Examiner* — Leron Beck
(74) *Attorney, Agent, or Firm* — Knobbe, Martens, Olson & Bear, LLP

(57) ABSTRACT

An eye open state determination device includes an eyelid opening degree detector that detects a degree of opening of an eyelid of the subject from an image of an eye of a subject acquired by an image acquirer, a red eye generator that illuminates the subject with light to generate a red eye image on the image of the eye, a red eye detector that detects presence or absence of generation of the red eye image, an operation controller that activates the red eye generator at a timing different from a timing at which the image acquirer acquires the image of the eye, and a determinator that determines an eye open state of the subject based on the degree of opening of the eyelid and the presence or absence of generation of the red eye image.

18 Claims, 8 Drawing Sheets

(51) Int. Cl.
*H04N 5/225* (2006.01)
*G06T 7/90* (2017.01)

(52) U.S. Cl.
CPC ............ *G06T 7/90* (2017.01); *H04N 5/2256* (2013.01); *G06T 2207/30216* (2013.01)

(58) Field of Classification Search
USPC .......................................................... 348/78
See application file for complete search history.

(56) References Cited

U.S. PATENT DOCUMENTS

| | | | | |
|---|---|---|---|---|
| 7,024,035 | B1* | 4/2006 | Enomoto | G06T 5/008 |
| | | | | 382/167 |
| 7,733,380 | B1* | 6/2010 | Cote | H04N 5/23212 |
| | | | | 348/220.1 |
| 8,498,449 | B2* | 7/2013 | Suzuki | G06K 9/00248 |
| | | | | 340/575 |
| 8,810,642 | B2* | 8/2014 | Tsukizawa | G06K 9/00604 |
| | | | | 348/78 |
| 9,177,202 | B2* | 11/2015 | Hanita | G06K 9/00604 |
| 2004/0070509 | A1* | 4/2004 | Grace | A61B 5/1103 |
| | | | | 340/575 |
| 2004/0170304 | A1* | 9/2004 | Haven | A61B 3/113 |
| | | | | 382/115 |
| 2004/0239777 | A1* | 12/2004 | Nakamura | H04N 1/00132 |
| | | | | 348/239 |
| 2005/0174448 | A1* | 8/2005 | Kuboi | G06K 9/0061 |
| | | | | 348/239 |
| 2008/0151186 | A1 | 6/2008 | Adachi et al. | |
| 2009/0003709 | A1* | 1/2009 | Kaneda | G06K 9/4628 |
| | | | | 382/190 |
| 2009/0219405 | A1* | 9/2009 | Kaneda | H04N 5/232 |
| | | | | 348/222.1 |
| 2014/0062724 | A1* | 3/2014 | Varoglu | G08G 1/163 |
| | | | | 340/902 |
| 2014/0112580 | A1* | 4/2014 | Hanita | G06T 1/00 |
| | | | | 382/165 |

FOREIGN PATENT DOCUMENTS

| | | |
|---|---|---|
| JP | 2008-158922 A | 7/2008 |
| JP | 2008-246013 A | 10/2008 |
| JP | 2010-146159 A | 7/2010 |
| WO | 2014/167848 A1 | 10/2014 |

* cited by examiner

■DETECTION TIMING OF EYE OPENING DEGREE

▽   CALCULATING EYE OPENING DEGREE FROM UPPER EYELID (30Hz)

▼   DETECTING EYE OPENING DEGREE FROM RED EYE (6Hz (EXAMPLE))

EYE OPEN STATE DETERMINATION DEVICE AND EYE OPEN STATE DETERMINATION METHOD

CROSS REFERENCE TO RELATED APPLICATIONS

The present application is based on Japanese Patent Application No. 2013-84350 filed on Apr. 12, 2013, the disclosure of which is incorporated herein by reference.

TECHNICAL FIELD

The present disclosure relates to an eye open state determination device and an eye open state determination method which determine an eye open state from a face image.

BACKGROUND ART

As an example of known eye open state determination device, an eye open state determination device shown in Patent Literature 1 has been known. The eye open state determination device (eyelid detection device) in Patent Literature 1 includes an image acquisition unit, an eyelid detection unit, and a red eye detection unit. The image acquisition unit acquires a face image. The eyelid detection unit detects upper and lower eyelids from the face image on the basis of an edge serving as a light-dark border. The red eye detection unit senses a spatial light-dark change in an iris portion from the face image to detect a red eye phenomenon, in which light incident on a pupil is reflected by a choroid coat layer in an eyeball and projected on the face image. When the red eye phenomenon is detected by the red eye detection unit, the eyelid detection unit excludes the edge of the pupil associated with the red eye phenomenon from candidates for the edges of the actual upper and lower eyelids.

When a red eye phenomenon described above occurs, the edge of the red eye pupil can be a candidate for the edge of the upper or lower eyelid. Consequently, the edge of the red eye pupil may possibly be determined as the edge of the actual upper or lower eyelid. For example, when an edge appearing over the red eye pupil is determined as the edge of the lower eyelid, it may be erroneously determined from the positional relationship with the edge of the actual upper eyelid that an eye is open. Thus, the red eye phenomenon serves to disturb the determination of the eyelids.

Accordingly, in the eye open state determination device in Patent Literature 1, the edge of the pupil resulting from the red eye phenomenon is excluded from candidates for the edges of the upper and lower eyelids so that the edges of the actual upper and lower eyelids can be correctly recognized and an eye open state can be reliably determined.

PRIOR ART LITERATURE

Patent Literature

Patent Literature 1: JP-2008-158922A

SUMMARY OF INVENTION

According to studies by the inventor of the present application, when a subject squarely faces the image acquisition unit, the eyelid is correctly detected from a face image. However, when, e.g., the subject faces downward, the shape of the eyelid is not correctly recognized and, even though the eye of the subject is open, it may be erroneously determined that the eye is closed.

In view of the foregoing, an object of the present disclosure is to provide an eye open state determination device and an eye open state determination method that can inhibit erroneous determination of an eye open state.

In an example of the present disclosure, an eye open state determination device comprises an image acquirer that acquires an image of an eye of a subject, an eyelid opening degree detector that detects a degree of opening of an eyelid of the subject from a state of the eyelid in the image of the eye, a red eye generator that illuminates a pupil of the subject with light to cause the light to be reflected at a retina and to be projected as a red eye image on the image of the eye, a red eye detector that detects presence or absence of generation of the red eye image, an operation controller that activates the red eye generator at a timing different from a timing at which the image acquirer acquires the image of the eye, and a determinator that determines an eye open state of the subject based on the degree of opening of the eyelid obtained by the eyelid opening degree detector and the presence or absence of generation of the red eye image obtained by the red eye detector.

According to this disclosure, the eyelid opening degree detector detects the degree of opening of the eyelid from the state of the eyelid based on the image of the eye acquired by the image acquirer. When the red eye generator is activated and the eye of the subject is in an open state, the red eye image is projected on the image of the eye. That is, the determinator can determine that the eye of the subject is open when the red eye image is detected by the red eye detector and determine that the eye of the subject is closed when the red eye image is not detected by the red eye detector.

In the above eye open state determination device, the red eye generator is activated at the timing different from the timing when the image acquirer acquires the image of the eye. Accordingly, when the red eye generator is not activated, the eyelid opening degree detector can precisely detect the degree of opening of the eyelid based on the image of the eye without being affected by the red eye. This allows the determiner to precisely determine the eye open state of the subject.

When, e.g., the subject faces downward, the eyelid opening degree detector determining the degree of opening of the eyelid may erroneously determine that the state of the eyelid is close to a closed-eye state even though the eye is open. In such a case also, when the line of sight of the subject is directed to the image acquirer, the red eye generator can obtain the red eye image, and the determinator can determine that the eye of the subject is open. Thus, by using the result of detecting the presence or absence of the red eye image in combination with the degree of opening of the eyelid, the open eye state can be more precisely recognized. This can inhibit erroneous determination of the eye open state.

In an example of the present disclosure, an eye open state determination method comprises: acquiring an image of an eye of a subject using an image acquirer; detecting a degree of opening of eyelid of the subject from a state of the eyelid in the image of the eye; at a timing different from a timing of acquiring the image of the eye using the image acquirer, emitting light for red eye generation from a red eye generator toward the subject to generate a red eye image from the light for red eye generation reflected from a retina of the subject; detecting the presence or absence of generation of the red eye image; and determining an eye open state of the subject based on the presence or absence of generation of the eye image at a when the red eye generation light is emitted from the red eye generator and the degree of opening of the eyelid in the image of the eye at a when the red eye generation light is not emitted from the red eye generator. This eye open state determination method can also achieve the same advantages as the foregoing eye open state determination device.

EMBODIMENTS FOR CARRYING OUT INVENTION

Figure 1:
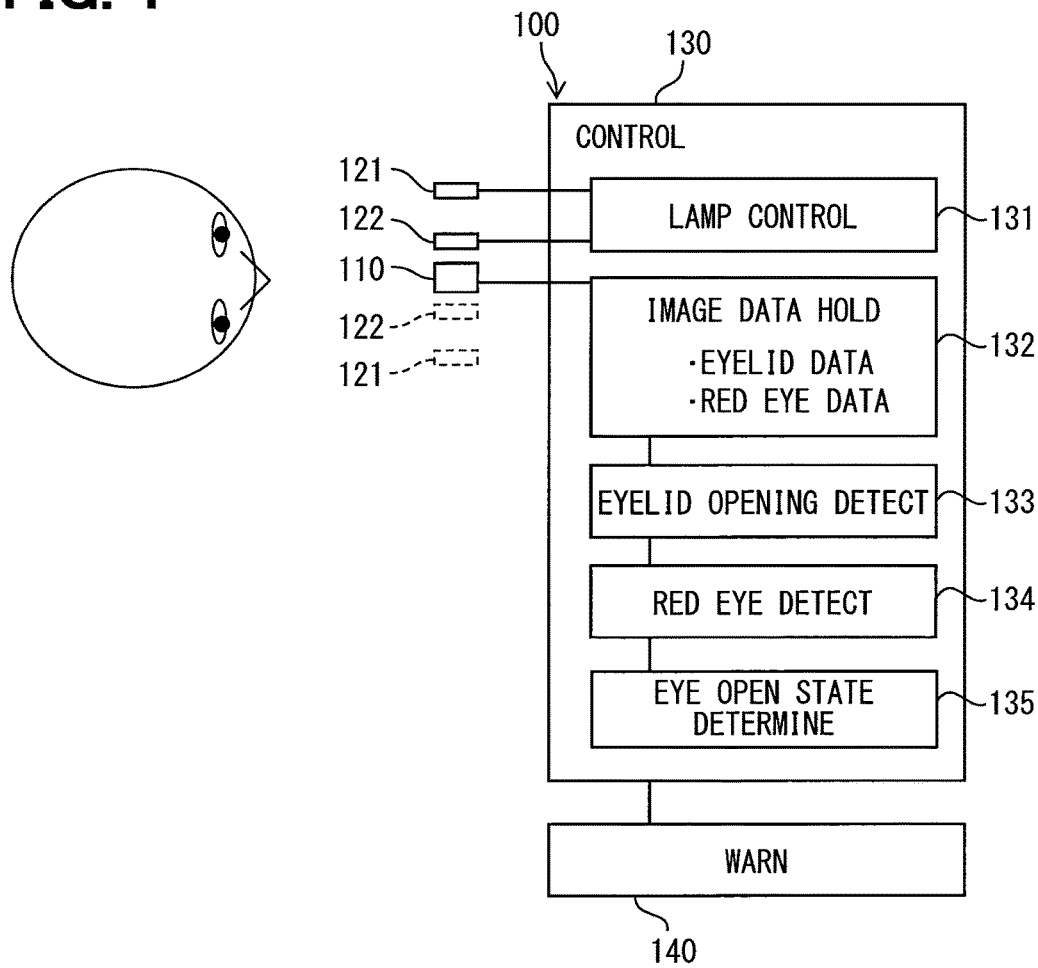
FIG. 1 is a block diagram showing an eye open state determination device in a first embodiment.

Embodiments will be described with reference to the drawings. In each of the embodiments, parts corresponding to those described in the previous embodiment may be designated by the same reference numerals to omit a repeated description thereof. When only a part of a configuration is described in an embodiment, another embodiment can be applied to the other part of the configuration. Not only it is possible to combine parts as explicitly shown in each of the embodiments, but also it is possible to partially combine embodiments even though such combinations are not explicitly shown as long as the combination involves no particular trouble.

First Embodiment

Figure 2:
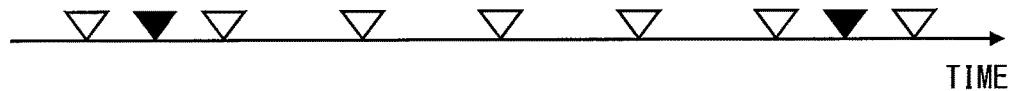
FIG. 2 is a time chart showing timings for detecting an eyelid and a red eye.
Figure 3:
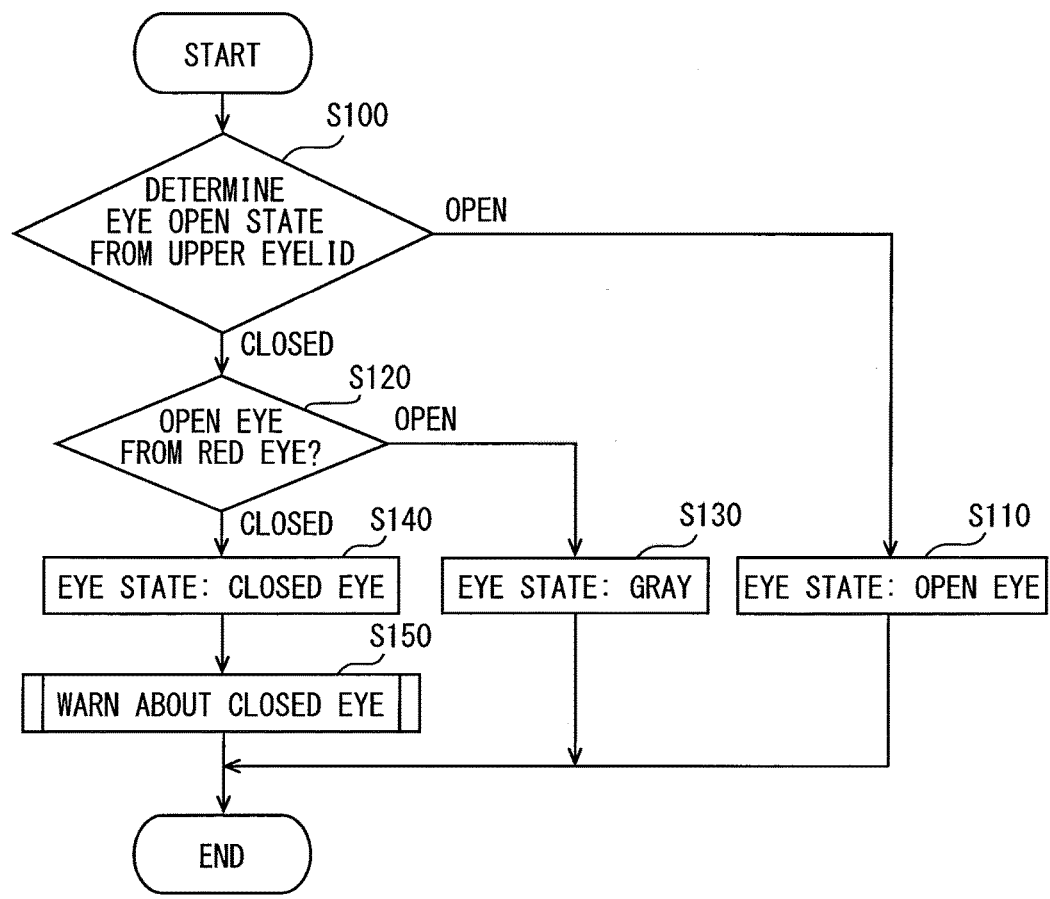
FIG. 3 is a control flow chart showing a control procedure in the first embodiment.

With reference to FIGS. 1 to 3, an eye open state determination device 100 in the first embodiment will be described. The eye open state determination device 100 (driver status monitoring device) is applied to a vehicle to recognize the eye open state of a driver (subject) while driving (whether an eye of the driver is open or closed) in order to support safe driving. Note that there is also another driver status monitoring device which, in order to support safe driving, recognizes the degree of concentration, the face direction, the line-of-sight direction, or the like of the driver while driving besides the eye open state of the driver. As shown in FIG. 1, the eye open state determination device 100 includes a camera 110, lamps 121 and 122, a control unit 130, a warning device 140, and the like.

The camera 110 corresponds to an example of an image acquirer (image acquisition means) which acquires an image of an eye of the driver. The camera 110 is attached to, e.g., a steering wheel so as to face the eye (face) of the driver. For example, a CCD camera or the like can be used as the camera 110. The CCD camera acquires image data by converting an image formed with a lens into an electric signal using an image sensing element such as a CCD (Charge Coupled Device) or the like and digitizing it on a per pixel basis.

In acquiring the image of the eye, the camera 110 may also acquire an image of not only the periphery of the driver's eye, but also an image of the whole face (face image) of the driver. The camera 110 outputs the acquired eye image data to an image data holding unit 132 of the control unit 130.

The lamp 121 acts as a light source unit which illuminates the driver's eyes when the image of the driver's eye is acquired and, e.g., an LED light is used. The operation of the lamp 121 is controlled by a lamp control unit 131 of the control unit 130. In the steering wheel, the lamp 121 is set at a position at a given distance from the camera 100. That is, the position of the lamp 121 is set such that the angle formed between a line connecting the lamp 121 and the driver's eye and a line connecting the driver's eye and the camera 110 is not less than a predetermined angle (e.g., not less than 2 degrees). This is for minimizing a red eye phenomenon, in which the light from the lamp 121 is incident on a pupil of the driver and reflected from a retina in an eyeball to directly reach the camera 110 and the reflected light is projected on the eye image.

Contrary to the foregoing lamp 121, the lamp 122 intentionally causes the red eye phenomenon of the driver. The lamp 122 corresponds to an example of a red eye generator (red eye generation means) and, e.g., an LED light is used. The operation of the lamp 122 is controlled by the lamp control unit 131 of the control unit 130. In the steering wheel, the lamp 122 is placed in proximity to the camera 110. That is, the light from the lamp 122 is controlled to be incident on the pupil of the driver and reflected from the retina in the eyeball to directly reach the camera 110 and the reflected light is projected as a red eye on the eye image.

One lamp 121 and one lamp 122 may be provided on one side of the camera 110 (shown by the solid lines in FIG. 1). Alternatively, two pairs of the lamps 121 and 122 may also be provided on both sides of the camera 110, respectively (shown by the solid lines and the broken lines in FIG. 1).

The control unit 130 holds the eye image from the camera 110 and detects the degree of opening of the eyelid and the presence or absence of the red eye generation from the held image data to determine the eye open state of the driver and further operate the below-described warning device 140 in accordance with the eye open state. The control unit 130 corresponds to an example of a control means. The control unit 130 includes the lamp control unit 131, the image data holding unit 132, an eyelid opening degree detection unit 133, a red eye detection unit 134, an eye open state determination unit 135, and the like.

The lamp control unit 131 controls the operation of the foregoing lamps 121 and 122. The lamp control unit 131 corresponds to an example of an operation controller (operation control means). As shown in FIG. 2, the lamp control unit 131 brings the lamp 121 into an ON state at predetermined first intervals (e.g., interval of 0.03-Second=30 Hz). As shown in FIG. 2, the lamp control unit 131 also brings the lamp 122 into the ON state at predetermined second intervals (e.g., interval of 0.17-second=6 Hz) set longer than the foregoing first interval. Thus, the frequency of turning on the lamp 122 per given time is set lower than the frequency of turning on the lamp 121 per given time.

The lamp control unit 131 activates the lamp 122 such that the timing of activating the lamp 122 is different from the timing of activating the lamp 121. That is, the lamp control unit 131 does not simultaneously activate the lamps 121 and 122.

The image data holding unit 132 holds (stores) the eye image data acquired by the camera 110 in time series in respective foregoing first and second intervals. The eye image data includes eyelid data and red eye data, which are used in the following ways.

The eyelid data is acquired when the lamp 121 is activated. The eyelid data represents, e.g., the line shape of the upper eyelid of the upper and lower eyelid of the driver. In a state where the driver's eye is open, the line shape of the upper eyelid is recognized as an upwardly protruding curved line. When, e.g., the driver becomes sleepy to reach a state where the eye is almost or fully closed, the curvature of the line shape of the upper eyelid decreases so that the line shape of the upper eyelid is recognized as a shape closer to a horizontal linear line.

Note that, when the red eye phenomenon occurs in the eyelid data, luminosity (contrast) in a pupil portion excessively increases to make it hard to recognize the line shape of the upper eyelid. Accordingly, as described above, at a time when the eyelid data is acquired (when the lamp 121 is activated), the lamp 122 is prevented from being activated. When, e.g., the driver faces downward relative to the camera 110, the curvature of the line shape of the upper eyelid is recognized to be lower.

The red eye data is acquired when the lamp 122 is activated. The red eye data represents the presence or absence of a red eye generated in the pupil portion of the driver. In a state where the driver's eye is open, when the lamp 122 is activated and the line of sight is directed to the camera 110, the red eye phenomenon occurs in the pupil portion of the eye image data. That is, the red eye phenomenon results in the eye image data in which the luminosity in the pupil portion is extremely high. This makes it possible to reliably recognize that the eye is open. Conversely, in a state where the driver's eye is closed, even when the lamp 122 is activated, the red eye phenomenon does not occur. This makes it possible to recognize that the eye is closed. Thus, the red eye data has a "0" or "1" characteristic depending on whether the driver's eye is open or closed.

The eyelid opening degree detection unit 133 detects the degree of opening of the driver's eyelid (degree of opening of the eye) from the foregoing eyelid data (eyelid state). The eyelid opening degree detection unit 133 corresponds to an example of an eyelid opening degree detecting means. The eyelid opening degree detection unit 133 is provided with a map which associates the curvature of the line shape of the upper eyelid with the degree of opening of the eyelid corresponding to the curvature. The map can be such that, e.g., the abscissa represents the curvature and the ordinate represents the degree of opening of the eyelid corresponding to the curvature. As the curvature is higher, the degree of opening of the eyelid is higher. The eyelid opening degree detection unit 133 recognizes the curvature from the upper eyelid line shape in the eyelid data and calculates the degree of opening of the eyelid corresponding to the curvature, while successively storing the calculated degree of opening of the eyelid in association with the eyelid data.

In the map, one threshold for determining the eye open state is provided for the degree of opening of the eyelid. The eyelid opening degree detection unit 133 determines that the eye is open or closed, depending on whether the degree of opening of the eyelid is higher or lower than the threshold. The threshold can be set as, e.g., a 20% eyelid opening. Note that the situations where the eye is closed include a situation where the driver faces downward relative to the camera 110, a situation where the driver blinks many times, and the like in addition to a situation where the driver becomes sleepy.

The red eye detection unit 134 detects the presence or absence of occurrence of the red eye from the foregoing red eye data. The red eye detection unit 134 corresponds to an example of a red eye detection means. When there is a red eye phenomenon in the pupil portion of the eye image data, the red eye detection unit 134 determines that the eye is open. Conversely, when there is no red eye phenomenon, the red eye detection unit 134 determines that the eye is closed. The red eye detection unit 134 recognizes the presence or absence of occurrence of the red eye and successively stores the result in association with the red eye data.

The eye open state determination unit 135 finally determines the eye open state of the driver based on the results of detection by the eyelid opening degree detection unit 133 and the red eye detection unit 134. The eye open state determination unit 135 corresponds to an example of a determinator (determination means). As will be described later, when the eye open state determination unit 135 determines that each of the results of determination by the eyelid opening degree detection unit 133 and the red eye detection unit 134 is a closed-eye state, the eye open state determination unit 135 determines that the driver's eye is closed and outputs a signal for activating the below-described warning device 140.

The warning device 140 takes measures for safe driving on the driver. The warning device 140 corresponds to an example of a measures device (measures means). The warning device 140 is an example of a warning notifier (warning means) which gives a warning to the driver. The warning device 140 can be formed as, e.g., an alarm and makes a predetermined sound to awake the driver whose eye is closed, e.g., in a situation where the driver is dozing off.

The following will describe the operation of the above-configured eye open state determination device 100 with reference to a control flow chart shown in FIG. 3. The control flow chart shown in FIG. 3 illustrates eye open state determination control repeatedly performed at predetermined intervals (e.g., every 30 seconds) by the control unit 130.

While the driver is driving, the lamp control unit 131 activates the lamp 121 at the first intervals. The camera 110 acquires the eye image at the first intervals, and the acquired eye image is stored as the eyelid data in the image data holding unit 132. The lamp control unit 131 activates the lamp 122 at the second intervals. This timing is different from the timing of acquiring the eyelid data described above. The camera 110 intentionally acquires the red eye data at the second intervals, and the acquired red eye data is stored in the image data holding unit 132.

Then, in S100, the eyelid opening degree detection unit 133 calculates the degree of opening of the driver's eyelid (the degree of opening of the eye) from the eyelid data on the basis of the map and determines whether the eye is in an open state or in a closed state on the basis of the threshold. The determination is made using the plurality of eyelid data acquired during the time period between the present time and a predetermined time in the past. That is, every time the eye open state determination control is performed, a moving average of the plurality of eyelid data including the latest data is used. When, e.g., 80% or more of the plurality of eyelid data acquired during the predetermined time period indicates the 20% or more degree of opening of the eyelid, the eyelid opening degree detection unit 133 determines "open" and otherwise determines "close".

When the open is determined in S100, the eye open state determination unit 135 determines that the eye open state of the driver is "open eye" in S110. Here, because it is possible to recognize that the driver' eye is open with considerable certainty, the measures for safe driving are not particularly necessary and this eye open state determination control at the present time is ended.

On the other hand, when the close is determined in S100, the red eye detection unit 134 determines the presence or absence of occurrence of the red eye from the red eye data in S120. Note that situations where the close is determined in S100 correspond to not only a situation where the driver is sleepy but also a situation where the driver is not sleepy but faces downward relative to the camera 110, a situation where the driver's eye is out of condition and the driver blinks many times, and the like.

In the same manner as described above, the determination in S120 is made using the plurality of red eye data acquired during the time period between the present time and the predetermined time in the past. That is, every time the eye open state determination control in FIG. 3 is performed, a moving average of the plurality of red eye data including the latest data is used. When, e.g., 80% or more of the plurality of red eye data during the predetermined period represents the generation of the red eye, the open is determined and otherwise the close is determined. That is, even in the case where the open cannot be determined from the eyelid data (due to the downward direction the driver faces, blinks, or the like), when the generation of the red eye is recognized, the open is determined on the assumption that the eye may possibly be open.

When the open is determined in S120, the eye open state determination unit 135 determines that the eye open state of the driver is "gray". "Gray" represents a situation where it is not certain whether the eye is open or conversely closed. Here, since it is not certain that the driver's eye is closed, it is determined that the measures for safe driving are unnecessary and the eye open state determination control at the present time is ended.

Also, when the close is determined in S120, it follows that the close is determined from the eyelid data (S100) and the close is determined from the red eye data (S120). In this case, since it is possible to recognize that the driver's closed eye results from sleepiness, the eye open state determination unit 135 determines that the eye open state of the driver is the closed eye.

Then, in S150, the eye open state determination unit 135 outputs a signal to the warning device 140 for giving a warning and the warning device 140 gives a warning such as an alarm to awake the driver.

Thus, in the present embodiment, the eyelid opening degree detection unit 133 detects the degree of opening of the eyelid from the state of the eyelid on the basis of the eye image obtained by the camera 110. When the lamp 122 is activated and the driver's eye is in an open state, the red eye image is projected on the eye image. That is, the eye open state determination unit 135 can determine that the driver's eye is open when the red eye image is detected by the red eye detection unit 134 and determine that the driver's eye is closed when the red eye image is not detected.

In the present embodiment, the timing of activating the lamp 122 is different from the timing of acquiring the eye image with the camera 110. Accordingly, during the non-activation of the lamp 122, the eyelid opening degree detection unit 133 can precisely detect the degree of opening of the eyelid on the basis of the eye image without being affected by the red eye. This allows the eye open state determination unit 135 to correctly determine the eye open state of the driver.

In the detection of the degree of opening of the eyelid, when, e.g., the driver faces downward, the eyelid opening degree detection unit 133 may erroneously determine that the state of the eyelid is close to a closed-eye state even though the eye is open. In such a case also, when the driver's line of sight is directed to the camera 110, the red eye image resulting from the lamp 122 can be obtained and the eye open state determination unit 135 can determine that the driver's eye is open. By thus using the result of detecting the presence or absence of occurrence of the red eye image in addition to the degree of opening of the eyelid, it is possible to more correctly recognize the eye open state and thus inhibit erroneous determination of the eye open state.

In particular, on determining that the eyelid is closed from the degree of opening of the eyelid and determining that there is no generated red eye image, the eye open state determination unit 135 determines that the driver is in a closed-eye state.

Because the closed-eye determination is made using both of the closed-eye determination based on the degree of opening of the eyelid and the closed-eye determination based on the absence of red eye generation. Consequently, it is possible to more correctly determine the closed-eye state and inhibit erroneous determination of a closed-eye state based only on the degree of opening of the eyelid.

In addition, the second interval at which the lamp 122 is activated is set longer than the first interval at which the camera 110 (lamp 121) is activated to acquire an eye image.

Normally, it is possible to determine the eye open state of the driver by detecting the degree of opening of the eyelid using the eyelid opening degree detection unit 133. By additionally setting the second interval at which the lamp 122 is activated longer than the first interval at which the camera 110 is activated, it is possible to reduce the frequency of the activation of the lamp 122 and reduce the energy used by the lamp 122. Consequently, it is possible to reduce the heat generated from the lamp 122, reduce the heat generated in the eye open state determination device 100, and improve the heat endurance thereof.

On determining that the driver is in a closed-eye state, the eye open state determination unit 135 activates the warning device 140 for the driver. This allows the warning device 140 to give a warning about the closed-eye state to the driver and thus allows the driver to continue safer driving.

Second Embodiment

Figure 4:
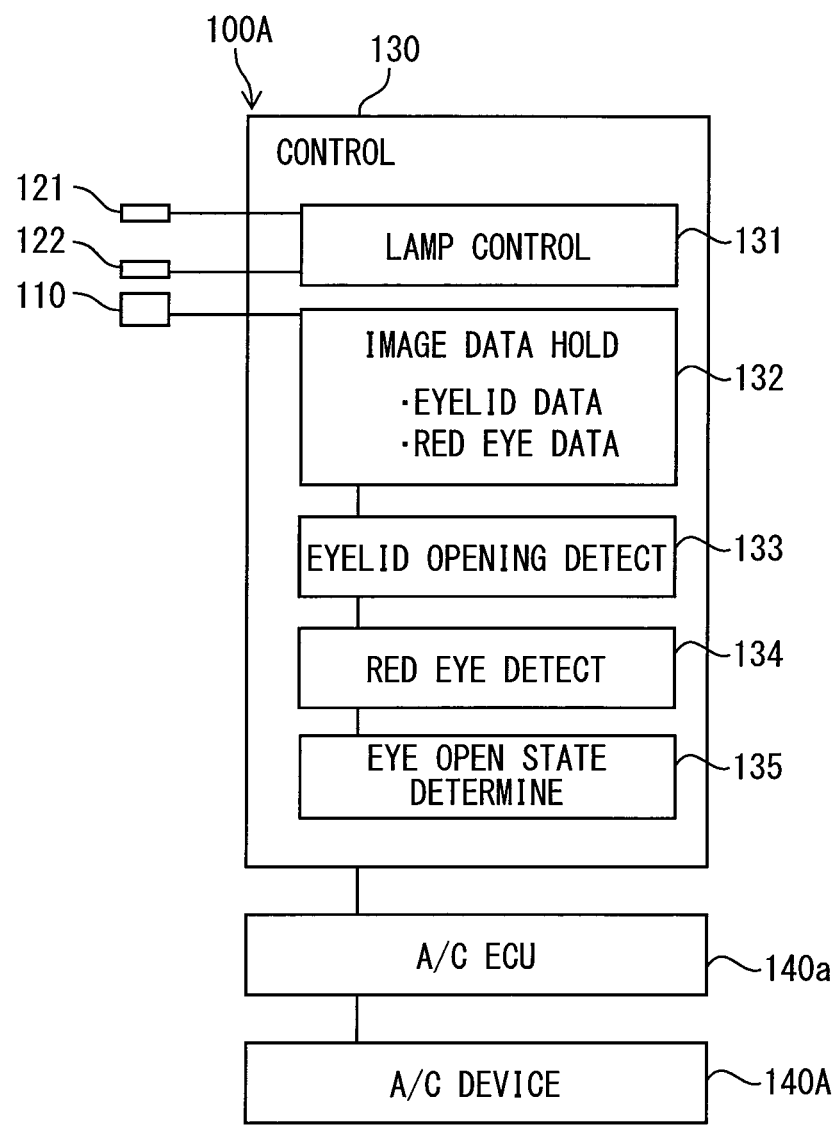
FIG. 4 is a block diagram showing an eye open state determination device in a second embodiment.
Figure 5:
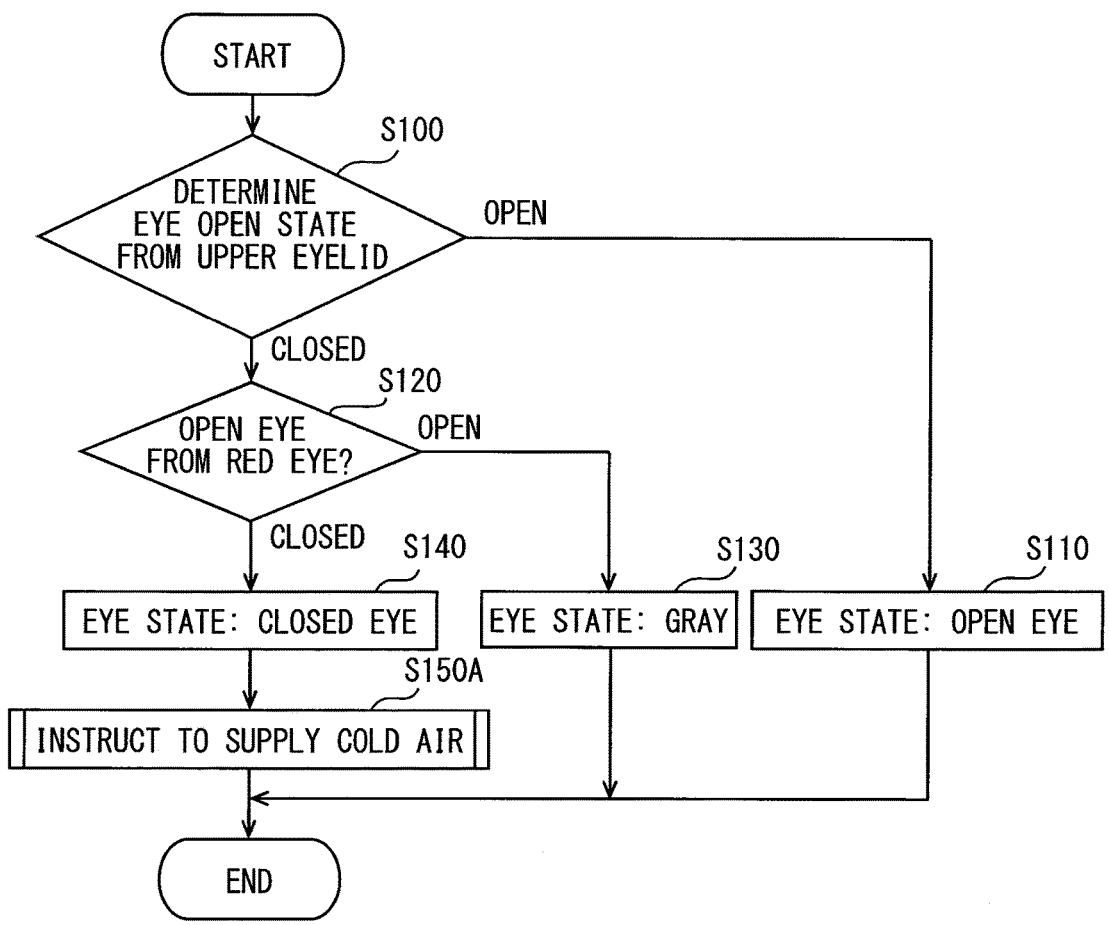
FIG. 5 is a control flow chart showing a control procedure in the second embodiment.

An eye open state determination device 100A in the second embodiment is shown in FIGS. 4 and 5. The eye open state determination device 100A in the second embodiment is different from the eye open state determination device 100 in the foregoing first embodiment in that the warning device 140 serving as the measures unit for safe driving of the driver is replaced with an air conditioning device 140A. The air conditioning device 140A corresponds to an example of a cold air supply device (cold air supply means). Also, the control flow chart in FIG. 5 is different from the control flow chart described with FIG. 3 in that S150 is replaced with S150A.

The air conditioning device 140A (FIG. 4) blows out conditioning air from a predetermined outlet under the air conditioning conditions required by the driver. The operation of the air conditioning device 140A is controlled by an air conditioning ECU 140a. Specifically, the air conditioning ECU 140a determines air conditioning operation conditions in accordance with the set temperature set by the driver and the other air conditioning environmental conditions (an outside air temperature, an inside air temperature, an amount of solar radiation, and the like) and supplies the conditioning air required by the driver into a vehicle compartment.

As shown in FIG. 5, in the eye open state determination control, when determining the closed-eye in S140, the eye open state determination unit 135 outputs a signal for the measures for safe driving to the air conditioning ECU 140a in S150A. Specifically, the eye open state determination unit 135 gives an instruction to blow out conditioning air (cold air) at a temperature lower by a predetermined temperature than the already designated temperature of the conditioning air. On receipt of the instruction, the air conditioning ECU 140Aa changes the set temperature of the conditioning air and controls the air conditioning device 140A to blow out the cold air from the outlet toward the driver.

As a result, when it is determined that the driver's eye is closed and the driver is conceivably dozing off, it is possible to give stimulation to the driver with the cold air and awake the driver to allow the driver to continue safe driving.

Third Embodiment

Figure 6:
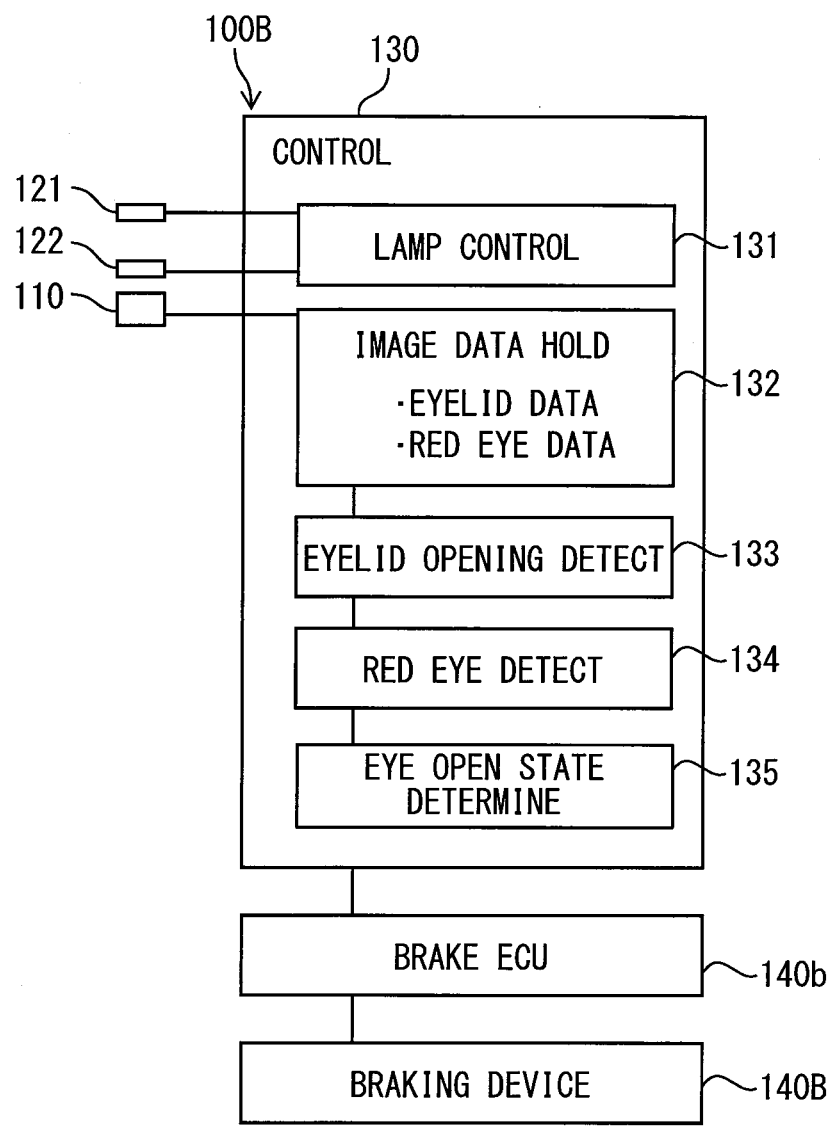
FIG. 6 is a block diagram showing an eye open state determination device in a third embodiment.
Figure 7:
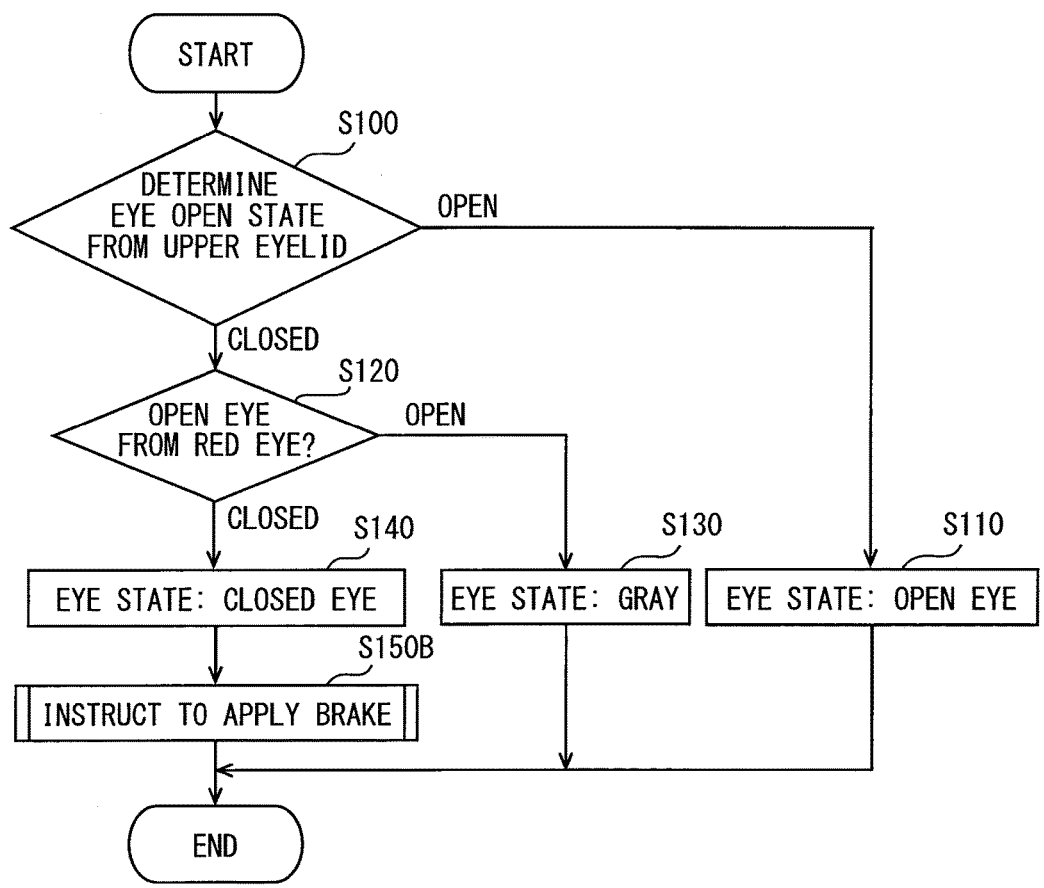
FIG. 7 is a control flow chart showing a control procedure in the third embodiment.

An eye open state determination device 100B in a third embodiment is shown in FIGS. 6 and 7. The eye open state determination device 100B in the third embodiment is different from the eye open state determination device 100 in the foregoing first embodiment in that warning device 140 serving as the measures device for safe driving of the driver is replaced with a braking device 140B. The braking device 140B corresponds to an example of a braking means. Also, the control flow chart in FIG. 7 is different from the control flow chart shown in FIG. 3 in that S150 is replaced with S150B.

The braking device 140B (FIG. 6) applies a stopping or decelerating braking force to a driving vehicle. The activation of the braking device 140B is controlled by a brake ECU 140b.

As shown in FIG. 7, in the eye open state determination control, when determining the closed-eye in S140, the eye open state determination unit 135 outputs a signal for the safe driving measures to the brake ECU 140b. Specifically, the eye open state determination unit 135 gives an instruction to activate the braking device 140B for deceleration (or a stop). On receipt of the instruction, the brake ECU 140b activates the braking device 140B to decelerate (or stop) the vehicle.

This allows the braking device 140B to apply a brake to the vehicle and achieve a just-in-case vehicle speed and thus allows the driver to continue safe driving.

Fourth Embodiment

Figure 8:
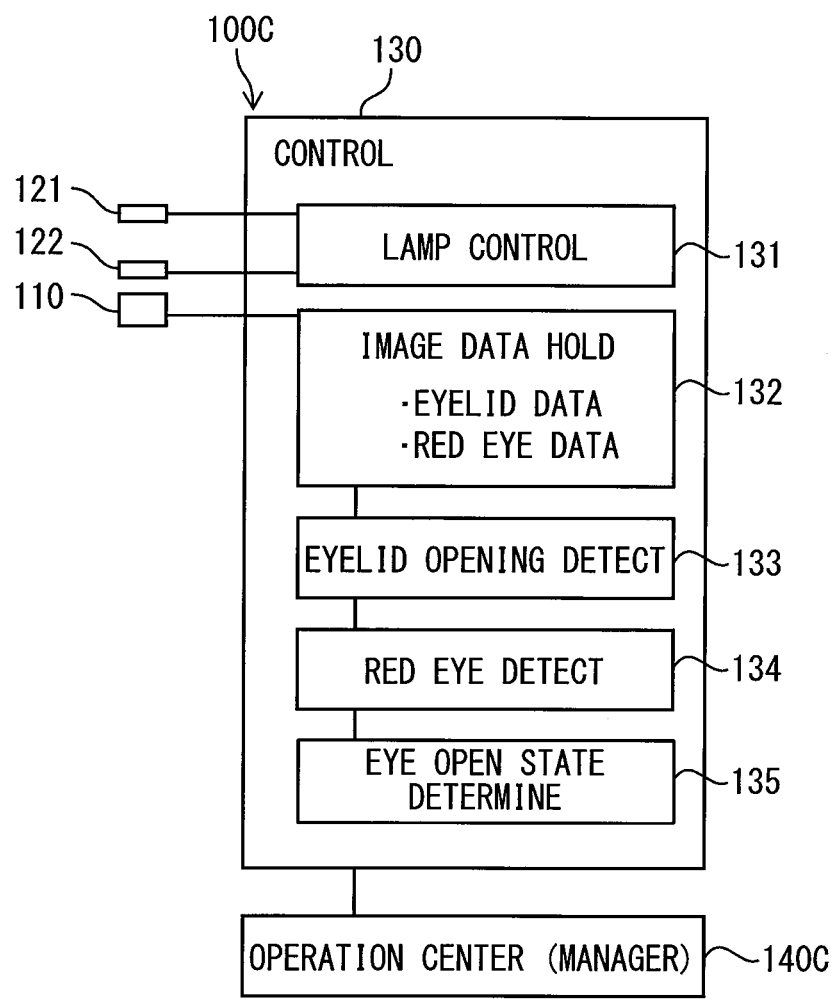
FIG. 8 is a block diagram showing an eye open state determination device in a fourth embodiment.
Figure 9:
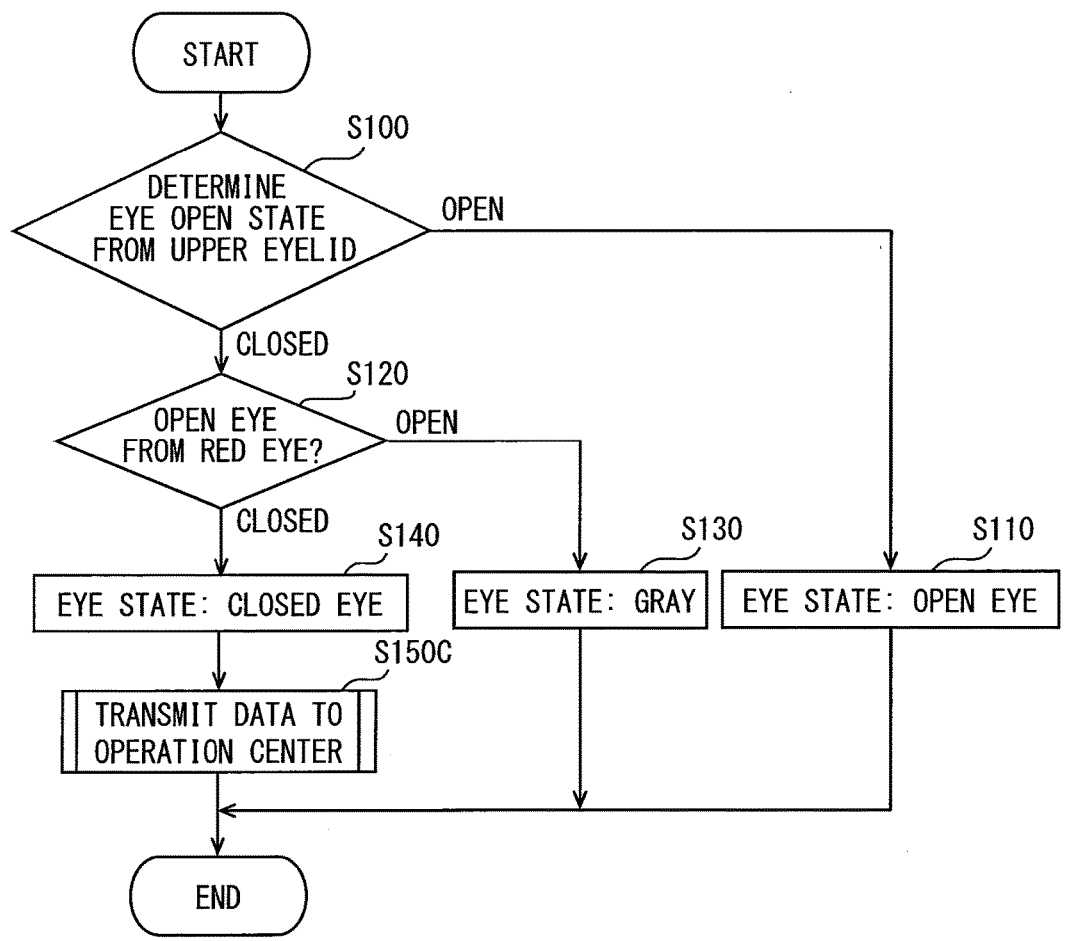
FIG. 9 is a control flow chart showing a control procedure in the fourth embodiment.

An eye open state determination device 100C in the fourth embodiment is shown in FIGS. 8 and 9. The eye open state determination device 100C in the fourth embodiment is different from the eye open state determination device 100 in the foregoing first embodiment in that data on the eye open state determined by the eye open state determination unit 135 (especially the result of closed-eye determination) is transmitted to a storage of an operation center 140C and the data is stored in the storage in time series.

The operation center 140C (FIG. 8) is, e.g., a data management center (manager) which manages an operation in a home delivery service. The driver is the driver of a home delivery truck. The types of shipments, shipment loading/unloading times, shipment loading/unloading places, transportation routes, and the like during the period from the start of the transportation to the end thereof are managed on a daily basis by the operation center 140C (manager in an operating company) and are stored daily as management data in the storage.

The control flow chart shown in FIG. 9 is different from the control flow chart shown in FIG. 3 in that S150 is replaced with S150C. In the eye open state determination control, when determining the closed eye, the eye open state determination unit 135 transmits the closed-eye determination result to the operation center 140C in S150C. To the storage of the operation center 140C, the closed-eye determination result is added in addition to the daily management data.

This allows the manager to recognize data on the eye open state of the driver (result of the closed-eye determination) in time series. Consequently, the manager can takes measures such warning the driver about future driving, changing working hours when the driver seems to be tired, changing working hours of a day, and so forth and allow the driver to continue a home delivery service based on safe driving.

Other Embodiments

The foregoing first embodiment assumes that the eye open state determination device 100 includes the warning device 140. Alternatively, for example, an alarm device may be provided in a vehicle combination meter. When the close is determined in S140, a signal for activating the device may be transmitted to a meter control unit which controls the combination meter.

In the foregoing first embodiment, the interval at which the lamp 122 is activated is set longer than the interval at which the lamp 121 is activated. Alternatively, the intervals may be set equal.

Also, the threshold of the degree of opening of the eyelid which is used in determining the eye opening degree based on the eyelid data, the generation rate of the data exceeding the threshold which is used in determining the open, the generation rate of the red eye which is used in determining the open-eye based on the red eye data, and the like are not limited to those in the foregoing embodiments but may be set as required.

In determining the degree of opening of the eye based on the eyelid data, the curvature of the upper eyelid is used. Alternatively, the curvature of the lower eyelid or the curvatures of the upper and lower eyelids may be used or the distance between the upper and lower eyelids or the like may be recognized.

The invention claimed is:

1. An eye open state determination device comprising:
an image acquirer that acquires an image of an eye of a subject;
an eyelid opening degree detector that detects a degree of opening of an eyelid of the subject from a state of the eyelid in the image of the eye;
a red eye generator that illuminates a pupil of the subject with light to cause the light to be reflected at a retina and to be projected as a red eye image on the image of the eye;
a red eye detector that detects presence or absence of generation of the red eye image;

an operation controller that activates the red eye generator at a timing different from a timing at which the image acquirer acquires the image of the eye; and a determinator that determines, as an eye open state of the subject, whether the eye of the subject is open, closed, or uncertain, based on the degree of opening of the eyelid obtained by the eyelid opening degree detector and the presence or absence of generation of the red eye image obtained by the red eye detector, wherein the subject is a driver of a vehicle, upon determining that (i) the degree of opening of the eyelid of the subject is lower than a threshold and (ii) there is no generation of the red eye image, the determinator determines that the eye of the subject is closed and the determinator activates a measures device to implement measures for safe driving on the driver, and upon determining that (i) the degree of opening of the eyelid of the subject is lower than the threshold and (ii) there is generation of the red eye image, the determinator determines that it is uncertain whether the eye of the subject is open or closed, and the determinator does not activate the measures device and does not implement the measures for safe driving on the driver, and upon determining that the degree of opening of the eyelid of the subject is greater than or equal to the threshold, the determinator determines, regardless of generation and no-generation of the red eye image, that the eye of the subject is open and the determinator does not activate the measures device and does not implement the measures for safe driving on the driver.

2. The eye open state determination device according to claim 1, wherein
an interval at which the red eye generator is activated is longer than an interval at which the image acquirer is activated.

3. The eye open state determination device according to claim 1, wherein
the eye open state determination device is mounted in the vehicle.

4. The eye open state determination device according to claim 3, wherein
the measures device includes a warning device that gives a warning to the driver.

5. The eye open state determination device according to claim 3, wherein
the measures device includes a cold air supply device that supplies cold air to the driver.

6. The eye open state determination device according to claim 3, wherein
the measures device includes a braking device that applies a brake to the vehicle.

7. The eye open state determination device according to claim 1, wherein
the eye open state determination device is mounted in a vehicle,
the subject is a driver, and
data on the eye open state of the driver obtained by the determinator is stored in time series in a storage of the vehicle or a predetermined data management center.

8. An eye open state determination method comprising:
acquiring an image of an eye of a subject using an image acquirer;
detecting a degree of opening of an eyelid of the subject from a state of the eyelid in the image of the eye;
at a timing different from a timing of acquiring the image of the eye using the image acquirer, emitting light for red eye generation from a red eye generator toward the subject to generate a red eye image from the light for red eye generation reflected from a retina of the subject;
detecting the presence or absence of generation of the red eye image; and
determining, as an eye open state of the subject, whether the eye of the subject is open closed, or uncertain, based on
the presence or absence of generation of the eye image at a time when the light for red eye generation is emitted from the red eye generator and
the degree of opening of the eyelid in the image of the eye at a when the red eye generation light is not emitted from the red eye generator, wherein the subject is a driver of a vehicle, upon determining that (i) the degree of opening of the eyelid of the subject is lower than a threshold and (ii) there is no generation of the red eye image, the determinator determines that the eye of the subject is closed and the determinator activates a measurers device to implement measures for safe driving on the driver, and upon determining that (i) the degree of opening of the eyelid of the subject is lower than the threshold and (ii) there is generation of the red eye image, the determinator determines that it is uncertain whether the eye of the subject is open or closed, and the determinator does not activate the measures device and does not implement the measures for safe driving on the driver, and upon determining that the degree of opening of the eyelid of the subject is greater than or equal to the threshold, the determinator determines, regardless of generation and no-generation of the red eye image, that the eye of the subject is open and the determinator does not activate the measures device and does not implement the measures for safe driving on the driver.

9. The eye open state determination method according to claim 8, wherein
an interval at which the light for red eye generation is emitted to the pupil of the subject to generate the red eye image from the light for red eye reflected from the retina is set longer than an interval at which the image of the eye is acquired.

10. The eye open state determination method according to claim 8, wherein
the eye open state determination method is implemented in the vehicle.

11. The eye open state determination method according to claim 10, wherein
the measures for safe driving of the driver are implemented using a warning device that gives a warning.

12. The eye open state determination method according to claim 10, wherein
the measures for safe driving of the driver are implemented using a cold air supply device that supplies cold air to the driver.

13. The eye open state determination method according to claim 10, wherein
the measures for safe driving of the driver are implemented using a braking device that applies a brake to the vehicle.

14. The eye open state determination method according to claim 8, wherein
the eye open state determination method is implemented in the vehicle,
and
data on the eye open state of the driver is stored in time series in a storage of the vehicle or a predetermined data management center.

15. The eye open state determination device according to claim 1, wherein
the eyelid opening degree detector detects the degree of opening of the eyelid of the subject based on a curvature of the upper eyelid or a curvature of the lower eyelid.

16. The eye open state determination device according to claim 1, wherein
the eyelid opening degree detector detects the degree of opening of the eyelid of the subject based on a distance between an upper eyelid and a lower eyelid.

17. The eye open state determination method according to claim 8, wherein
the degree of opening of the eyelid of the subject is based on a curvature of the upper eyelid or a curvature of the lower eyelid.

18. The eye open state determination method according to claim 8, wherein
the degree of opening of the eyelid of the subject is based on a distance between an upper eyelid and a lower eyelid.

\* \* \* \* \*